(12) United States Patent
Nicolas et al.

(10) Patent No.: US 12,471,638 B2
(45) Date of Patent: Nov. 18, 2025

(54) AEROSOL-GENERATING DEVICE WITH ARTICLE POSITION DETECTOR

(71) Applicant: Philip Morris Products S.A., Neuchatel (CH)

(72) Inventors: Frederic Nicolas, Moret-Loing-et-Orvanne (FR); Cyrille Poindron, Cruseilles (FR)

(73) Assignee: Philip Morris Products S.A., Neuchatel (CH)

( * ) Notice: Subject to any disclaimer, the term of this patent is extended or adjusted under 35 U.S.C. 154(b) by 700 days.

(21) Appl. No.: 17/600,730

(22) PCT Filed: Mar. 31, 2020

(86) PCT No.: PCT/EP2020/059148
§ 371 (c)(1),
(2) Date: Oct. 1, 2021

(87) PCT Pub. No.: WO2020/201295
PCT Pub. Date: Oct. 8, 2020

(65) Prior Publication Data
US 2022/0167682 A1    Jun. 2, 2022

(30) Foreign Application Priority Data
Apr. 2, 2019  (EP) ................... 19166798

(51) Int. Cl.
*A24F 40/53*  (2020.01)
*A24D 1/20*  (2020.01)
(Continued)

(52) U.S. Cl.
CPC ............... *A24F 40/53* (2020.01); *A24D 1/20* (2020.01); *A24F 40/10* (2020.01); *A24F 40/20* (2020.01);
(Continued)

(58) Field of Classification Search
CPC ................... A24F 40/53; A24D 1/20
(Continued)

(56) References Cited

U.S. PATENT DOCUMENTS

2014/0096782 A1* 4/2014 Ampolini ............... A24F 40/60
131/328
2014/0345606 A1* 11/2014 Talon ............... A61M 16/0003
128/203.14
(Continued)

FOREIGN PATENT DOCUMENTS

CN    108208944 A     6/2018
EP       3556232 A1 * 10/2019  ........... A24F 47/008
(Continued)

OTHER PUBLICATIONS

International Search Report and Written Opinion issued on Aug. 4, 2020 in PCT/EP2020/059148 filed Mar. 31, 2020, 6 pages.
(Continued)

*Primary Examiner* — Dionne W. Mayes
(74) *Attorney, Agent, or Firm* — Oblon, McClelland, Maier & Neustadt, L.L.P.

(57) ABSTRACT

An aerosol-generating device is provided, including: a receiving region configured to removably receive an aerosol-generating article including an aerosol-generating substrate; a position detector configured to detect a position of the received aerosol-generating article; a warning element configured to generate a warning signal; and a controller configured to receive a signal from the position detector indicative of the position of the received aerosol-generating article, control the warning element to generate a warning signal when the aerosol-generating article is in an improper position, and control the warning element to generate a further warning signal for a predetermined time, when a heating element of the aerosol-generating device is operated longer than a second predetermined time during which the aerosol-generating article is in an improper position.

14 Claims, 7 Drawing Sheets

(51) Int. Cl.
*A24F 40/10* (2020.01)
*A24F 40/20* (2020.01)
*A24F 40/42* (2020.01)
*A24F 40/46* (2020.01)
*A24F 40/51* (2020.01)
*A24F 40/57* (2020.01)
*A24F 40/60* (2020.01)

(52) U.S. Cl.
CPC .............. *A24F 40/42* (2020.01); *A24F 40/46* (2020.01); *A24F 40/51* (2020.01); *A24F 40/57* (2020.01); *A24F 40/60* (2020.01)

(58) Field of Classification Search
USPC .......................................... 131/271, 328, 329
See application file for complete search history.

(56) References Cited

U.S. PATENT DOCUMENTS

| | | | |
|---|---|---|---|
| 2015/0128966 A1* | 5/2015 | Lord | A24F 40/40 131/328 |
| 2016/0302488 A1 | 10/2016 | Fernando et al. | |
| 2017/0086508 A1* | 3/2017 | Mironov | A24D 1/20 |
| 2018/0153208 A1 | 6/2018 | Schaller et al. | |
| 2018/0296777 A1 | 10/2018 | Terry et al. | |
| 2019/0175846 A1 | 6/2019 | Terry et al. | |
| 2020/0038603 A1 | 2/2020 | Terry et al. | |
| 2020/0178608 A1 | 6/2020 | Fernando et al. | |
| 2021/0007401 A1* | 1/2021 | Moloney | A24F 40/53 |

FOREIGN PATENT DOCUMENTS

| | | | |
|---|---|---|---|
| RU | 2 644 314 C2 | 2/2018 | |
| RU | 2 676 506 C1 | 12/2018 | |
| WO | WO 2015/082560 A1 | 6/2015 | |
| WO | WO-2017/001817 A1 * | 1/2017 | ............ A24F 40/10 |
| WO | WO 2017/207442 A1 | 12/2017 | |

OTHER PUBLICATIONS

International Preliminary Report on Patentability issued on May 18, 2021 in PCT/EP2020/059148 filed Mar. 31, 2020, 6 pages.
Russian Decision to Grant issued Apr. 27, 2022 in Russian Patent Application No. 2021131878/03(067534), 7 pages (submitting English Translation only).

* cited by examiner

AEROSOL-GENERATING DEVICE WITH ARTICLE POSITION DETECTOR

The present invention relates to an aerosol-generating device, an aerosol-generating system and a method for generating a warning signal for an improper position of an aerosol-generating article received in an aerosol-generating device.

It is known to provide an aerosol-generating device for generating an inhalable vapor. Such devices may heat aerosol-generating substrate contained in an aerosol-generating article without burning the aerosol-generating substrate. The aerosol-generating article may be received in the aerosol-generating device, particularly a heating chamber of the aerosol-generating device. A heating element is arranged in or around the heating chamber for heating the aerosol-generating substrate once the aerosol-generating article is inserted into the heating chamber of the aerosol-generating device. Typically, the aerosol-generating article is inserted into the aerosol-generating device by a user. During insertion or during use, an aerosol-generating article may not be correctly inserted or may shift from the initial position. Also, a user may remove an aerosol-generating article before the aerosol generating operation is finalized. The aerosol generation may be influenced in an improper way, if the aerosol-generating article is not received in the aerosol-generating device as designated.

It would be desirable to have an aerosol-generating device with optimized functionality if an aerosol-generating article is in an incorrect position.

According to an aspect of the invention there is provided an aerosol-generating device comprising a receiving region configured for removably receiving an aerosol-generating article comprising aerosol-generating substrate. The device further comprises a position detector configured to detect the position of the received aerosol-generating article, a warning element configured to generate a warning signal and a controller. The controller is configured to receive a signal from the position detector indicative of the position of the received aerosol-generating article. The controller is further configured to control the warning element to generate a warning signal, when the aerosol-generating article is in an improper position.

The warning signal being generated allows the aerosol-generating article to be optimally operated when the aerosol-generating article is in the improper position. A user may adjust the position of the aerosol-generating article when perceiving the warning signal. In this way, an incorrect or non-optimized position of the aerosol-generating article may be prevented. An incorrect or non-optimized position of the aerosol-generating article may result in the aerosol generated in an improper way. Also, an improper position of the aerosol-generating article may lead to the danger of the aerosol-generating article falling out or being detached from the aerosol-generating device. For example, during use, the position of the aerosol-generating article may slightly change due to the aerosol-generating device being moved around or shaken. If this position changes, the aerosol-generating article would not be correctly perceived by the user, the aerosol-generating article could fall out, or the aerosol generating article could be detached from the aerosol-generating device. This would typically mean that a new aerosol-generating article has to be inserted. Due to providing a warning signal when detecting an incorrect position of the aerosol-generating article, the user can prevent the aerosol-generating article from completely falling out or being fully detached from the aerosol-generating device.

Instead of the aerosol-generating article changing its position during use of the aerosol-generating device, potentially the aerosol-generating article could also be inserted by a user in an improper way or in the way deviating from the optimal way. This may also lead to the aerosol-generating article being received by the aerosol-generating device in an improper position. By generating the warning signal, a user may perceive that the aerosol-generating article has not been optimally positioned in the aerosol-generating device and may correct the positioning of the aerosol-generating device.

Further, an improper position of an aerosol-generating article may lead to the aerosol not being generated in an optimized way. For example, the distance between the aerosol-generating substrate comprised in the aerosol-generating article and the heating element of the aerosol-generating device may differ from an optimal distance, if the aerosol-generating article is in an improper position. For example, the aerosol-generating substrate may not be heated to a sufficient temperature for optimal aerosol generation. The generation of the warning signal allows a user to reposition the aerosol-generating article, thus aerosol may be optimally generated.

As a further advantage of the proposed aerosol-generating device, overheating of the heating element of the aerosol-generating device may be prevented. In this regard, an improper position of the aerosol-generating device may result in the heating element not being able to transmit heat properly towards and into the aerosol-generating substrate of the aerosol-generating article. This may lead to an increase of the temperature of the heating element, which may be undesired. Potentially, undesirable constituents may be generated in the aerosol, if the temperature of heating element exceeds a certain temperature. The generation of the warning signal allows the user to correct the position of the aerosol-generating article to prevent the heating element from overheat.

Additionally, waste of the aerosol-generating articles may be prevented. In this regard, an improper position of the aerosol-generating article may increase the chances of the aerosol-generating article falling out or being detached from the aerosol-generating device. Typically, the user would lose such an article even if the aerosol-generating substrate in the aerosol-generating substrate is not fully depleted yet and then would insert a new aerosol-generating article.

As used herein, an 'aerosol-generating device' relates to a device that interacts with an aerosol-generating substrate to generate an aerosol. The aerosol-generating substrate may be part of an aerosol-generating article, for example part of a smoking article. An aerosol-generating device may be a smoking device that interacts with an aerosol-generating substrate of an aerosol-generating article to generate an aerosol that is directly inhalable into a user's lungs through the user's mouth. An aerosol-generating device may be a holder.

The device is preferably a portable or handheld device that is comfortable to hold between the fingers of a single hand. The device may be substantially cylindrical in shape and has a length of between 70 and 120 mm. The maximum diameter of the device is preferably between 10 and 20 mm. In one embodiment the device has a polygonal cross section and has a protruding button formed on one face. In this embodiment, the diameter of the device is between 12.7 and 13.65 mm taken from a flat face to an opposing flat face; between 13.4 and 14.2 mm taken from an edge to an opposing edge (i.e., from the intersection of two faces on one side of the device to a corresponding intersection on the other side), and between 14.2 and 15 mm taken from a top of the button to an opposing bottom flat face.

The device may be an electrically heated smoking or vaping device. The device may be an electrically smoking or vaping device that generates aerosol by mechanical vibration or spraying.

As used herein, the term 'aerosol-generating article' refers to an article comprising an aerosol-generating substrate that is capable of releasing volatile compounds that can form an aerosol. For example, an aerosol-generating article may be an aerosol former that generates an aerosol, which is directly inhalable into a user's lungs through the user's mouth. An aerosol-generating article may be disposable. A tobacco stick is referred to an aerosol-generating article comprising an aerosol-generating substrate that comprises tobacco.

The aerosol-generating article may be substantially cylindrical in shape. The aerosol-generating article may be substantially elongate. The aerosol-generating article may have a length and a circumference substantially perpendicular to the length. The aerosol-generating substrate may be substantially cylindrical in shape. The aerosol-generating substrate may be substantially elongate. The aerosol-generating substrate may also have a length and a circumference substantially perpendicular to the length.

The aerosol-generating article may have a total length between approximately 30 mm and approximately 100 mm. The aerosol-generating article may have an external diameter between approximately 5 mm and approximately 12 mm. The aerosol-generating article may comprise a filter plug. The filter plug may be located at a downstream end of the aerosol-generating article. The filter plug may be a cellulose acetate filter plug. The filter plug is approximately 7 mm in length in one embodiment, but may have a length of between approximately 5 mm to approximately 10 mm.

In one embodiment, the aerosol-generating article has a total length of approximately 45 mm. The aerosol-generating article may have an external diameter of approximately 7.2 mm. Further, the aerosol-generating substrate may have a length of approximately 10 mm. Alternatively, the aerosol-generating substrate may have a length of approximately 12 mm. Further, the diameter of the aerosol-generating substrate may be between approximately 5 mm and approximately 12 mm. The aerosol-generating article may comprise an outer paper wrapper. Further, the aerosol-generating article may comprise a separation between the aerosol-generating substrate and the filter plug. The separation may be approximately 18 mm, but may be in the range of approximately 5 mm to approximately 25 mm.

Alternatively, the aerosol-generating article may be configured as a cartridge. A cartridge is particularly preferred, if the aerosol-generating substrate is provided as liquid aerosol-generating substrate. If the aerosol-generating substrate is provided in a liquid form, the liquid aerosol-generating substrate may be contained in a liquid storage portion of the cartridge. The liquid storage portion is adapted for storing the liquid aerosol-generating substrate to be supplied to the heating element of the aerosol-generating device. Alternatively, the cartridge itself could comprise a heating element for vaporizing the liquid aerosol-generating substrate. In this case, the aerosol-generating device may not comprise a heating element but only supply electrical energy towards the heating element of the cartridge, when the cartridge is received by the aerosol-generating device. The liquid storage portion may comprise couplings such as self-healing pierceable membranes for facilitating supply of the liquid aerosol-generating substrate towards the heating element. The membranes avoid undesired leaking of the liquid aerosol-generating substrate stored in the liquid storage portion. A respective needle-like hollow tube may be provided to pierce through the membrane. The liquid storage portion may be configured as a replaceable tank or container.

The cartridge may have any suitable shape and size. For example, the cartridge may be substantially cylindrical. The cross-section of the cartridge may, for example, be substantially circular, elliptical, square or rectangular.

The cartridge may comprise a housing. The housing may comprise a base and one or more sidewalls extending from the base. The base and the one or more sidewalls may be integrally formed. The base and one or more sidewalls may be distinct elements that are attached or secured to each other. The housing may be a rigid housing. As used herein, the term 'rigid housing' is used to mean a housing that is self-supporting. The rigid housing of the cartridge may provide mechanical support to the heating element. The cartridge may comprise one or more flexible walls. The flexible walls may be configured to adapt to the volume of the liquid aerosol-generating substrate stored in the cartridge. Preferably, the cartridge comprises, as described above, a liquid storage portion, which may comprise the flexible wall. The cartridge may comprise a rigid housing, while a liquid storage portion comprising a flexible wall may be housed within the rigid housing. The housing of the cartridge may comprise any suitable material. The cartridge may comprise substantially fluid impermeable material. The housing of the cartridge may comprise a transparent or a translucent portion, such that liquid aerosol-generating substrate stored in the cartridge may be visible to a user through the housing. The cartridge may be configured such that aerosol-generating substrate stored in the cartridge is protected from ambient air. The cartridge may be configured such that aerosol-generating substrate stored in the cartridge is protected from light. This may reduce the risk of degradation of the substrate and may maintain a high level of hygiene.

The liquid aerosol-generating substrate may be absorbed into a porous carrier material. The porous carrier material may be made from any suitable absorbent plug or body, for example, a foamed metal or plastics material, polypropylene, terylene, nylon fibres or ceramic. The liquid aerosol-generating substrate may be retained in the porous carrier material prior to use of the aerosol-generating device or alternatively, the liquid aerosol-generating substrate material may be released into the porous carrier material during, or immediately prior to use.

The cartridge may be substantially sealed. The cartridge may comprise one or more outlets for liquid aerosol-generating substrate stored in the cartridge to flow from the cartridge to the aerosol-generating device. The cartridge may comprise one or more semi-open inlets. This may enable ambient air to enter the cartridge. The one or more semi-open inlets may be semi-permeable membranes or one-way valves, permeable to allow ambient air into the cartridge and impermeable to substantially prevent air and liquid inside the cartridge from leaving the cartridge. The one or more semi-open inlets may enable air to pass into the cartridge under specific conditions. The cartridge may be refillable. Alternatively, the cartridge may be configured as a replaceable cartridge. The aerosol-generating device may be configured for receiving the cartridge. A new cartridge may be attached to the aerosol-generating device when the initial cartridge is spent.

As used herein, the term 'aerosol-generating substrate' relates to a substrate capable of releasing volatile compounds that can form an aerosol. Such volatile compounds may be released by heating the aerosol-generating substrate. An aerosol-generating substrate may conveniently be part of an aerosol-generating article or the aerosol-generating article.

The aerosol-generating substrate may be a solid aerosol-generating substrate. Alternatively, the aerosol-generating substrate may comprise both solid and liquid components. As a further alternative, the aerosol-generating substrate may be a liquid aerosol-generating substrate. As described above, liquid aerosol-generating substrate is preferably used in conjunction with a cartridge comprising a liquid storage portion. The aerosol-generating substrate may comprise a tobacco-containing material containing volatile tobacco flavour compounds which are released from the substrate upon heating. Alternatively, the aerosol-generating substrate may comprise a non-tobacco material. The aerosol-generating substrate may further comprise an aerosol former that facilitates the formation of a dense and stable aerosol. Examples of suitable aerosol formers are glycerine and propylene glycol.

The solid aerosol-generating substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-generating substrate may be in loose form, or may be provided in a suitable container or cartridge. Optionally, the solid aerosol-generating substrate may contain additional tobacco or non-tobacco volatile flavour compounds, to be released upon heating of the substrate. The solid aerosol-generating substrate may also contain capsules that, for example, include the additional tobacco or non-tobacco volatile flavour compounds and such capsules may melt during heating of the solid aerosol-generating substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise combining one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

Optionally, the solid aerosol-generating substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

In a particularly preferred embodiment, the aerosol-generating substrate comprises a gathered crimped sheet of homogenised tobacco material. As used herein, the term 'crimped sheet' denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article. This advantageously facilitates gathering of the crimped sheet of homogenised tobacco material to form the aerosol-generating substrate. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled. In certain embodiments, the aerosol-generating substrate may comprise a gathered sheet of homogenised tobacco material that is substantially evenly textured over substantially its entire surface. For example, the aerosol-generating substrate may comprise a gathered crimped sheet of homogenised tobacco material comprising a plurality of substantially parallel ridges or corrugations that are substantially evenly spaced-apart across the width of the sheet.

The solid aerosol-generating substrate may be deposited on the surface of the carrier in the form of, for example, a sheet, foam, gel or slurry. The solid aerosol-generating substrate may be deposited on the entire surface of the carrier, or alternatively, may be deposited in a pattern in order to provide a non-uniform flavour delivery during use.

In the liquid aerosol-generating substrate, certain physical properties, for example the vapour pressure or viscosity of the substrate, are chosen in a way to be suitable for use in the aerosol generating system. The liquid preferably comprises a tobacco-containing material comprising volatile tobacco flavour compounds which are released from the liquid upon heating. Alternatively, or in addition, the liquid may comprise a non-tobacco material. The liquid may include water, ethanol, or other solvents, plant extracts, nicotine solutions, and natural or artificial flavours. Preferably, the liquid further comprises an aerosol former. Examples of suitable aerosol formers are glycerine and propylene glycol.

The aerosol-generating device may comprise electric circuitry. The electric circuitry may be configured as the controller. The electric circuitry may comprise a microprocessor, which may be a programmable microprocessor. The microprocessor may be part of the controller. The electric circuitry may comprise further electronic components. The electric circuitry may be configured to regulate a supply of power to the heating element. Power may be supplied to the heating element continuously following activation of the system or may be supplied intermittently, such as on a puff-by-puff basis. The power may be supplied to the heating element in the form of pulses of electrical current. The electric circuitry may be configured to monitor the electrical resistance of the heating element, and preferably to control the supply of power to the vaporiser dependent on the electrical resistance of the heating element.

The aerosol-generating device may comprise a power supply, typically a battery. As an alternative, the power supply may be another form of charge storage device such as a capacitor. The power supply may require recharging and may have a capacity that enables to store enough energy for one or more uses; for example, the power supply may have sufficient capacity to continuously generate aerosol for a period of around six minutes or for a period of a multiple of six minutes. In another example, the power supply may have sufficient capacity to provide a predetermined number of puffs or discrete activations of the heating element.

The heating element may be any device suitable for heating the aerosol-generating substrate and vaporize at least a part of the aerosol-generating substrate in order to form an inhalable aerosol. The heating element may exemplarily be a coil heater, a capillary tube heater, a mesh heating element or a metal plate heater. The heating element may exemplarily be a resistive heating element which receives electrical power and transforms at least part of the received electrical power into heat energy. Alternatively, or in addition, the heating element may be a susceptor that is inductively heated by a time varying magnetic field. The heating element may comprise only a single heating element or a plurality of heating elements. The temperature of the heating element or elements is preferably controlled by electric circuitry.

In all of the aspects of the disclosure, the heating element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physico-chemical properties required.

The heating element may be part of an aerosol-generating device. The aerosol-generating device may comprise an internal heating element or an external heating element, or both internal and external heating elements, where "internal" and "external" refer to the aerosol-generating substrate. An internal heating element may take any suitable form. For example, an internal heating element may take the form of a heating blade. Alternatively, the internal heater may take the form of a casing or substrate having different electro-conductive portions, or an electrically resistive metallic tube. Alternatively, the internal heating element may be one or more heating needles or rods that run through the center of the aerosol-generating substrate. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

An external heating element may take any suitable form. For example, an external heating element may take the form of one or more flexible heating foils on a dielectric substrate, such as polyimide. The flexible heating foils can be shaped to conform to the perimeter of the substrate receiving cavity. Alternatively, an external heating element may take the form of a metallic grid or grids, a flexible printed circuit board, a molded interconnect device (MID), ceramic heater, flexible carbon fibre heater or may be formed using a coating technique, such as plasma vapour deposition, on a suitable shaped substrate. An external heating element may also be formed using a metal having a defined relationship between temperature and resistivity. In such an exemplary device, the metal may be formed as a track between two layers of suitable insulating materials. An external heating element formed in this manner may be used to both heat and monitor the temperature of the external heating element during operation.

The internal or external heating element may comprise a heat sink, or heat reservoir comprising a material capable of absorbing and storing heat and subsequently releasing the heat over time to the aerosol-generating substrate. The heat sink may be formed of any suitable material, such as a suitable metal or ceramic material. In one embodiment, the material has a high heat capacity (sensible heat storage material), or is a material capable of absorbing and subsequently releasing heat via a reversible process, such as a high temperature phase change. Suitable sensible heat storage materials include silica gel, alumina, carbon, glass mat, glass fibre, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, a mixture of eutectic salts or an alloy. The heat sink or heat reservoir may be arranged such that it is directly in contact with the aerosol-generating substrate and can transfer the stored heat directly to the substrate. Alternatively, the heat stored in the heat sink or heat reservoir may be transferred to the aerosol-generating substrate by means of a heat conductor, such as a metallic tube.

The heating element advantageously heats the aerosol-generating substrate by means of conduction. The heating element may be at least partially in contact with the substrate, or the carrier on which the substrate is deposited. Alternatively, the heat from either an internal or external heating element may be conducted to the substrate by means of a heat conductive element.

During operation, the aerosol-generating substrate may be completely contained within the aerosol-generating device. In that case, a user may puff on a mouthpiece of the aerosol-generating device. Alternatively, during operation, the aerosol-generating article containing the aerosol-generating substrate may be partially contained within the aerosol-generating device. In that case, the user may puff directly on the aerosol-generating article.

The improper position of the aerosol-generating article may be a position, in which vaporization and aerosol generation of the aerosol-generating substrate of the aerosol-generating article is still possible. The improper position of the aerosol-generating article may be a position different from a desired optimal operation position of the aerosol-generating article.

Hence, the improper position may be a position in between the desired optimal operation position of the aerosol-generating article and a position of the aerosol-generating article, in which the aerosol cannot be generated. In other words, the improper position may be a position, in which the aerosol-generating device is still operable, but not optimally. In still other words, the improper position may be a position, in which the aerosol-generating device can still be operated, but in which a repositioning of the aerosol-generating article would be desirable to optimize operation of the aerosol-generating device. In this regard, the aerosol-generating device may be optimized for operation, if the aerosol-generating article is received by the aerosol-generating device in a desired optimal operation position. Any deviation from this desired optimal operation position may reduce the effectiveness of the aerosol generation. However, a small deviation from the desired optimal operation position may still be tolerable for aerosol generation. A predetermined deviation from the desired optimal operation position may be accepted as still fulfilling the requirement of the aerosol-generating article being positioned in the desired optimal operation position. Hence, the controller may be configured to only control generation of the warning signal by the warning element, if the aerosol-generating article is positioned outside of the predetermined desired optimal operation position. Further, the controller may be configured to stop generating the warning signal, if the aerosol generating article is in a position which deviates from the desired optimal operation position even more than the improper position. For example, the generation of the warning signal could be stopped, if the aerosol-generating article falls out of or is fully detached from the aerosol-generating device. In this case, the controller may be configured to stop operation of the heating element. Consequently, the aerosol-generating device is configured to operate normally, if the aerosol-generating article is positioned within the boundaries of the desired optimal operation position. If the aerosol-generating article deviates from this position within a certain boundary, this deviation is detected by the position detector and the warning signal is generated by the warning element. If the aerosol-generating article's position is changed even further in an undesired direction, operation of the heating element may be stopped by the controller and generation of the warning signal may also be stopped. Alternatively, the controller may be configured to stop operation of the heating element in this case, while the warning signal may still be generated. Thus, a user may perceive the warning signal and understand that the aerosol-generating article is not in the desired optimal operation position. Alternatively or additionally, the warning signal could be changed, if the position of the aerosol-generating article changes from an undesired position to a position in which operation of the aerosol-generating device is no longer possible. This may have the advantage of giving the user feedback in which position the aerosol-generating article is.

The position detector may comprise electrical contacts configured to contact a conductive region of the aerosol-generating article, when the aerosol-generating article is received in the receiving region or the position detector may comprise a conductive region configured to contact electrical contacts of the aerosol-generating article, when the aerosol-generating article is received in the receiving region.

In this aspect, the position detector may be configured to detect the position of the aerosol-generating article, if the conductive region of the aerosol-generating article comes into contact with the electrical contacts of the position detector. The conductive region of the aerosol-generating article may have a size and shape which enables positioning of the aerosol-generating article within certain boundaries, while still contacting the electrical contacts of the position detector. The position detector may comprise more than two electrical contacts for enabling detection of multiple positions of the aerosol-generating article. For example, the position detector may comprise a plurality of electrical contacts. In this case, if at least two of the electrical contacts of the position detector lose contact with the conductive region of the aerosol-generating article, the position detector detects that the aerosol-generating article is not positioned in the optimal desired operating position anymore, but in the improper position. In this case, the controller may be configured to output the warning signal to a user to indicate that the aerosol-generating article's position has changed from an optimal desired operating position to an improper position. If more than two contacts from the position detector lose contact with the conductive region of the aerosol-generating article, it may be detected by the position detector that the aerosol-generating article even surpassed the improper position and is now in a position, in which the aerosol-generating device can no longer be operated. Consequently, the controller may stop operation of the heating element. Consequently, the electrical contacts of the position detector may be used to detect whether the aerosol-generating article is within the optimal desired operating position or within the boundaries of the improper position.

Instead of the position detector comprising one or more electrical contacts and the aerosol-generating article comprising a conductive region, the position detector could comprise the conductive region, wherein the aerosol-generating article could comprise the one or more electrical contacts. The functionality of the position detector would be essentially identical. In this regard, the position detector could detect if the electrical contacts of the aerosol-generating article are received by the aerosol-generating device, to contact with the conductive region of the position detector and to determine whether the aerosol-generating article is in the desired optimal operation position or in the improper position, in which case the controller may be configured to output the warning signal.

The position detector may comprise a proximity sensor configured to measure the distance between the position of the aerosol-generating article and a desired optimal operation position of the aerosol-generating article.

The proximity sensor could be any known proximity sensor such as a laser sensor or an IR sensor. The proximity sensor may be arranged to measure the distance between the proximity sensor and an aerosol-generating article received into the aerosol-generating device. Particularly, the proximity sensor may be arranged at or near the base of the receiving region. The proximity sensor may measure the distance towards an aerosol-generating article, as the aerosol-generating article is received by the receiving region.

The proximity sensor may be configured as a Hall effect sensor.

The aerosol-generating article may comprise an element, which generates a magnetic field. This element may have the form of a bobbin. As the aerosol-generating article is inserted into the receiving region of the aerosol-generating device, the distance between the hall effect sensor and the bobbin of the aerosol-generating article decreases. Hence, the Hall effect sensor may measure the magnetic field generated by the corresponding element of the aerosol-generating article when the distance between the aerosol-generating article and the Hall effect sensor comes below a predetermined threshold. In this case, the proximity sensor may detect that the aerosol-generating article has reached the improper position in which the heating element may be activated and the aerosol-generating device may be operated. When the aerosol-generating article is fully received in the receiving region of the aerosol-generating device, the proximity sensor may detect that the aerosol-generating article is now in the desired optimal operation position.

The controller may be configured to enable the heating element of the aerosol-generating device to activate when the proximity sensor detects that the aerosol-generating article has reached the desired optimal operation position.

The element of the aerosol-generating article, which creates a magnetic field, may be placed near or at the end of the aerosol-generating article received by the receiving region of the aerosol-generating device. This end may be the distal end of the aerosol-generating article. Hence, when the aerosol-generating article is fully received in the receiving region of the aerosol-generating device, the magnetic field creating element of the aerosol-generating article may be arranged directly adjacent to the proximity sensor configured as a Hall effect sensor.

As used herein, the terms 'upstream', 'downstream', 'proximal' and 'distal' are used to describe the relative positions of components, or portions of components, of the aerosol-generating device and the aerosol-generating article in relation to the direction in which a user draws on the aerosol-generating device or the aerosol-generating article during use thereof.

The position detector may be configured to be deactivated or to prevent generation of the warning signal, when a heating element of the aerosol-generating device is not operated. The controller may be configured to prevent the warning element from generating the warning signal, when the heating element of the aerosol-generating device is not operated. The warning element may be configured to be deactivated or to prevent generation of the warning signal, when the heating element of the aerosol-generating device is not operated.

To prevent the user's confusion, the warning signal may not be generated, when the heating element is not operated. The positioning of the aerosol-generating article may not be critical when the heating element is not activated.

The controller may be configured to control the warning element to generate a further warning signal for a predetermined time, when a heating element of the aerosol-generating device is operated longer than a second predetermined time during which the aerosol-generating article is in an improper position.

The further warning signal may prevent overheating of the heating element. Heat may not transfer optimally from the heating element into the aerosol-generating substrate of the aerosol-generating article positioned in an improper position. Hence, the temperature of the heating element may rise to an undesirable degree. If the user does not correct the position of the aerosol-generating article from the improper position back to the desired optimal operation position, the heating element may thus overheat. Hence, the controller may be configured to measure a second predetermined time. The further warning signal may be generated, if the second predetermined time has elapsed. The further warning signal may be generated by the warning element to indicate to a user that the heating element may be overheated. A user may thus refrain from activating the aerosol-generating device during the period of the further warning signal. The further warning signal may be activated for a first predetermined time to enable cooling of the heating element so that the reactivation of the aerosol-generating device can safely be conducted due to the reduced temperature of the heating element. If a user repositions the aerosol-generating article before the second predetermined time has elapsed, the further warning signal may not be generated by the warning element. In this case, overheating of the heating element will not occur, since the aerosol-generating article is only positioned in the improper position for a short amount of time.

The controller may be configured to prevent operation of the heating element for the duration of the further warning signal.

Preventing operation of the heating element for the duration of the further warning signal may facilitate that the heating element can cool down sufficiently. Consequently, overheating of the heating element may be prevented in this way.

The receiving region may be a heating chamber.

The heating chamber may have a shape to enable insertion of the aerosol-generating article into the heating chamber. The heating element may be arranged in or around the heating chamber as an internal or external heating element as described above. This aspect is particularly preferred, if the aerosol-generating article comprises solid aerosol-generating substrate.

The aerosol-generating device may comprise a heating element, wherein the controller may be configured to allow activation of the heating element only if the position detector detects that the aerosol-generating article is in a desired optimal operation position.

According to this aspect, initial activation of the heating element may only be possible, if the aerosol-generating article is positioned in the desired optimal operation position. The heating element may be operable, when the aerosol-generating article is positioned in the desired optimal operation position. Additionally, the heating element may be operable, when the aerosol-generating article is positioned in the improper position. In addition to the heating element still being operable in this position of the aerosol-generating article, the warning signal will be generated by the warning element as described above. Hence, a consumer may still operate the aerosol-generating device for generating an inhalable aerosol while getting a feedback that the aerosol-generating article is no longer in the optimal desired operating position. For this reason, the user may be able to reposition the aerosol-generating article in due time during the continual operation of the aerosol generating device. If the aerosol-generating article is not repositioned in due time, a further warning signal may be generated by the warning element. As described above, the heating element may be shut down for the duration of the further warning signal to prevent overheating of the heating element. According to this aspect, the heating element can be operated, when the aerosol-generating article is in the desired optimal operation position or in the improper position. However, the heating element can only be activated, when the aerosol-generating article is in the desired optimal operation position. The heating element cannot be activated, when the position detector detects that the aerosol-generating article is received by the receiver portion in an improper position. In this way, it is ensured that the aerosol-generating article is initially correctly received in the receiving region before activation of the heating element.

The aerosol-generating device may comprise a heating element, wherein the controller may be configured to deactivate the heating element, if the position detector detects that the aerosol-generating article is in an improper position.

This aspect may increase security of the aerosol-generating device. In this regard, if the aerosol-generating article is in the improper position, this may negatively affect operation and aerosol generation of the aerosol-generating device. For example, as described above, the heating element may overheat, if the distance between the aerosol-generating article and the heating element is not optimal. Also, the generated aerosol may not have the desired quality, if the aerosol-generating article is not in the desired optimal operation position. Hence, it could be necessary or beneficial to deactivate the heating element, if the aerosol-generating article is positioned in the improper position. If the user repositions the aerosol-generating article into the desired optimal operation position, the controller may be configured to enable activation of the heating element.

The position detector may be configured to detect the distance of the aerosol-generating article from a desired optimal operation position, wherein the warning element may be configured to generate a gradual warning signal depending upon the detected distance of the aerosol-generating article from the desired optimal operation position.

The gradual warning signal may be perceived by the user so that the user can detect the degree of displacement of the aerosol-generating article. For example, as described above, if the position sensor is configured as a proximity sensor, the warning signal could be generated by the warning element as a function of the distance between the current position of the aerosol-generating article and the desired optimal operation position of the aerosol-generating article. If the aerosol-generating article comes closer towards the desired optimal operation position, the warning signal may gradually decrease. Vice versa, if the distance between the desired optimal operation position of the aerosol-generating article and the current position of the aerosol-generating article increases, the warning signal may correspondingly gradually increase. Hence, the gradual warning signal enables a user to understand how far the position of the aerosol-generating article is from the desired optimal operation position. From this, the user may learn how to optimally reposition the aerosol-generating article. Also, the user may learn when the aerosol-generating article threatens to fall out of or be detached from the aerosol-generating device.

The aerosol-generating device may comprise a heating element, wherein the heating element and the position detector may utilize a common electric circuit.

As described above, the heating element may be an electrically operated heating element. As also described above, the position detector may be electrically operated. Particularly, in case the heating element as well as the position detector are both electrically operated, using the same electric circuit for the position detector as well as for the heating element may simplify construction of the aerosol-generating device. Additionally, the aerosol-generating device may be designed more cost-effective in this case.

The warning signal could be any kind of known warning signal. For example, the warning signal could be a haptic warning signal. The haptic warning signal may be created by a haptic element such as a motor, for example a motor creating a vibration. The warning signal may be an optical warning signal such as a blinking LED. The warning signal may be an acoustic warning signal such as a sound. Consequently, the warning element may be configured as one or more of a motor, a light or an electroacoustic transducer.

The invention also relates to an aerosol-generating system comprising an aerosol-generating device as described above and an aerosol-generating article comprising aerosol-generating substrate.

The invention also relates to a method for generating a warning signal for an improper position of an aerosol-generating article received in an aerosol-generating device as described above, comprising:

detecting, by means of the position detector, the position of the received aerosol-generating article,
   controlling, by means of the controller, the warning element to generate a warning signal, when the aerosol-generating article is in an improper position.

The method may comprise the insertion of the aerosol-generating article into the receiving region of the aerosol-generating device.

The method may comprise detection, by means of the position detector, of the distance between the aerosol-generating article and the desired optimal operation position or of the distance between the aerosol-generating article and the position detector.

The method may comprise the deactivation of the heating element, when the position detector detects that the aerosol-generating article is positioned in the improper position. Alternatively, the method may comprise deactivation of the heating element, when the position detector detects that the aerosol-generating article is positioned even further from the desired optimal operation position than the improper position.

The method may comprise outputting a further warning signal, if the aerosol-generating article is positioned in the improper position longer than a first predetermined time. The further warning signal may be generated by the warning element for a second predetermined time to enable cooling of the heating element and thereby preventing overheating of the heating element.

Features described in relation to one aspect may equally be applied to other aspects of the invention.

The invention will be further described, by way of example only, with reference to the accompanying drawings in which.

Figure 1:
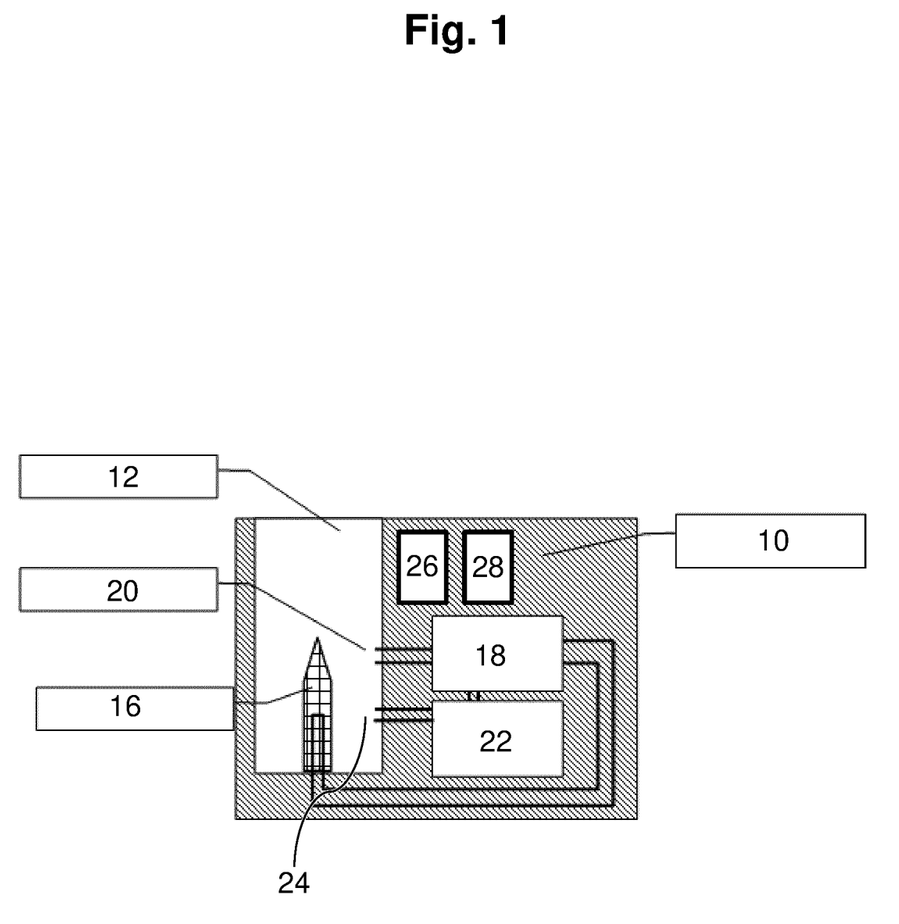
FIG. 1 shows an aerosol-generating device according to the present invention.

FIG. 1 shows an aerosol-generating device 10. The aerosol-generating device 10 comprises a receiving region 12 configured to receive an aerosol-generating article 14. The aerosol-generating article 14 is not shown in FIG. 1, but shown in below described FIG. 2 and the following figures. The receiving region 12 is in the aerosol-generating device 10 depicted in FIG. 1 shaped as a cavity. The cavity forms a heating chamber.

Further, a heating element 16 is depicted in FIG. 1. The heating element 16 has the shape of a pin or blade. The heating element 16 extends along the longitudinal axis of the receiving region 12. The heating element 16 is centrally arranged in the receiving region 12. The heating element 16 has a tapered proximal end for penetrating into the aerosol-generating substrate contained in the aerosol-generating article 14. The heating element 16 is an electrically heated heating element 16. The heating element 16 may be a resistive heating element 16. However, the heating element 16 may also be configured as an inductive heating element 16. In this case, the heating element 16 comprises susceptor material. Furthermore, surrounding the receiving region 12, an induction coil will in this case be arranged for creating Eddy currents in the heating element 16. In all embodiments described herein, the heating element 16 is preferably configured as a resistive heating element 16 but may also be configured as an inductive heating element 16.

FIG. 1 further shows a power supply 18. The power supply 18 is preferably configured as a battery. The power supply 18 is configured to supply electrical energy towards the heating element 16 for heating the heating element 16. FIG. 1 further shows electrical contacts of the power supply 20. In FIG. 1, the electrical contacts of the power supply 20 are open. In other words, the electrical contacts of the power supply 20 are not contacted in FIG. 1. As will be described in conjunction with below FIGS. 2 and 3, the contact of the power supply 18 can be contacted by the aerosol-generating article 14, when the aerosol-generating article 14 is inserted into the receiving region 12. In this case, the electrical contacts of the power supply 20 may be closed and supply of electrical energy from the power supply 18 to the heating element 16 may be enabled. Hence, it is ensured that the heating element 16 can only be operated, when an aerosol-generating article 14 is inserted into the receiving region 12. Thus, unwanted activation of the heating element 16 is prevented. Unwanted activation of the heating element 16 may lead to an unwanted overheating of the heating element 16. Also, unwanted activation of the heating element 16 may waste energy of the power supply 18.

Below the power supply 18, a position detector 22 is depicted in FIG. 1. The position detector 22 comprises electrical contacts of the position detector 24. The electrical contacts of the position detector 24 are configured to close, when an aerosol-generating article 14 is sufficiently inserted into the receiving region 12. Before that, as depicted in FIG. 1, the electrical contacts of the position element are open. The position detector 22 is configured to detect the position of the aerosol-generating article 14 within the receiving region 12. Particularly, the position detector 22 is configured to detect, if an aerosol-generating article 14 is positioned in an improper position. The output of the position detector 22 may be received by a controller 26. The controller 26 is also depicted in FIG. 1. The controller 26 is connected with the position detector 22. The connection is not depicted in FIG. 1. The controller 26 may also be connected with the heating element 16. The controller 26 may also be connected with the power supply 18. Particularly, the controller 26 may be configured to control the supply of electrical energy from the power supply 18 to the heating element 16. In this regard, the electrical contacts of the power supply 20 as depicted in FIG. 1 may prevent supply of electrical energy from the power supply 18 to the heating element 16, if the electrical contacts of the power supply 20 are not closed. However, the electrical contacts of the power supply 20 may be closed, when an aerosol-generating article 14 has not been fully inserted into the receiving region 12 into a desired optimal operation position. The position detector 22 may be configured to detect, if an aerosol-generating article 14 has been fully inserted into the receiving region 12. In other words, the position detector 22 may be configured to detect, if an aerosol-generating article 14 has been inserted into the receiving region 12 into a desired optimal operation position. The controller 26 may be configured to only enable activation of the heating element 16, if the position detector 22 detects that the aerosol-generating article 14 has been inserted into the desired optimal operation position. The insertion of the aerosol-generating article 14, the closing of the contacts of the power supply 18 and the closing of the contacts of the position detector 22 will be described in more detail below with reference to FIGS. 2 and 3.

FIG. 1 also shows a warning element 28. The warning element 28 may be configured to generate a warning signal to a user, if the position detector 22 detects that the aerosol-generating article 14 is positioned in an improper position. The warning element 28 may be connected with the controller 26. The connection between the warning element 28 and the controller 26 is not shown in FIG. 1. Furthermore, the warning element 28 may be connected with one or more of the power supply 18, the heating element 16 and the position detector 22. The warning element 28 may be configured to output an acoustic, haptic or optical signal. The controller 26 may be configured to control the generation of a warning signal by the warning element 28. The controller 26 may be configured to enable the generation of a warning signal only after the aerosol-generating article 14 has initially been positioned in the desired optimal operation position. In other words, the generation of a warning signal may be enabled after initially positioning the aerosol-generating article 14 and subsequent activating the heating element 16. If afterwards, during use, the position of the aerosol-generating article 14 changes to an improper position, the controller 26 may be configured to control the warning element 28 to generate a warning signal. Alternatively, the controller 26 may be configured to control the warning element 28 to generate a warning signal every time an aerosol-generating article 14 is in an improper position. The controller 26 may be configured to enable generation of a warning signal by the warning element 28 only if the electrical contacts of the heating element 40 are closed. In this case, the generation of a warning signal is prevented, if no aerosol-generating article 14 at all is inserted into the receiving region 12 and the normal operation of the aerosol-generating device 10 is desired.

Figure 2:
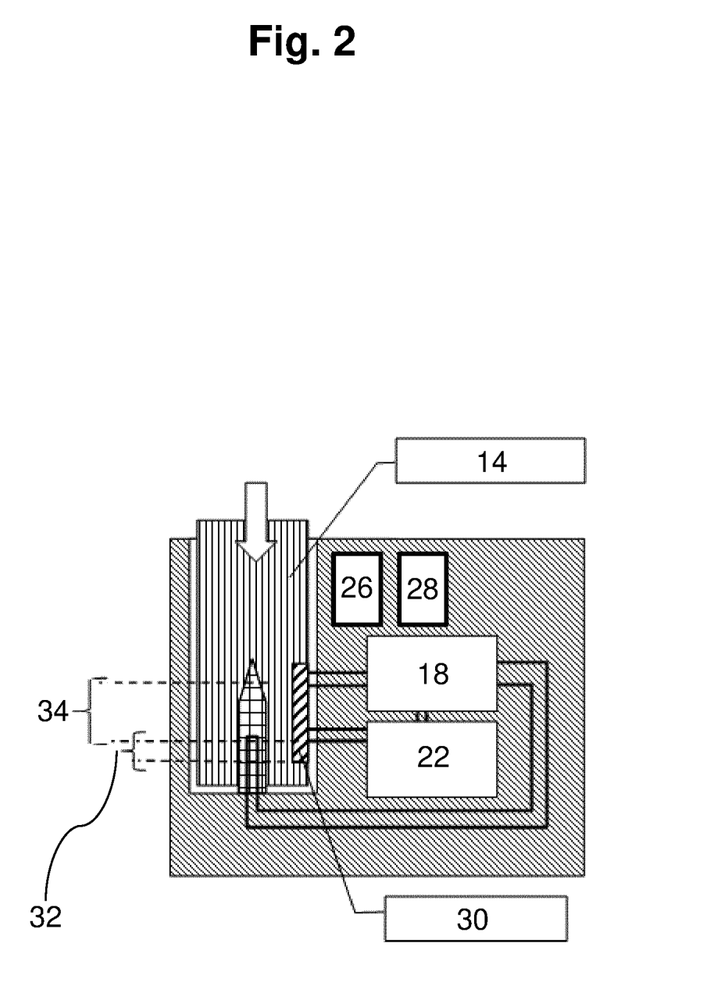
FIG. 2 shows the aerosol-generating device with a received aerosol-generating article.

FIG. 2 shows the aerosol-generating device 10 of FIG. 1, wherein an aerosol-generating article 14 has been fully inserted into the receiving region 12. The aerosol-generating article 14 comprises aerosol-generating substrate, which may be volatilized by the heating element 16 to generate an inhalable aerosol. The aerosol-generating article 14 is inserted at the proximal end of the aerosol-generating device 10. At first, the distal end of the aerosol-generating article 14 is inserted. A further mouthpiece (not shown) may be provided at the proximal end of the aerosol-generating article 14. The generated aerosol may flow into the mouthpiece for inhalation by a user. Alternatively, a user may directly draw on the proximal end of the aerosol-generating article 14 for inhalation of the generated aerosol. The aerosol-generating article 14 comprises a conductive region 30. The conductive region 30 is arranged at or near the distal end of the aerosol-generating article 14. The conductive region 30 is arranged at the outer circumference of the aerosol-generating article 14. Preferably, the conductive region 30 has a ring shape and is arranged fully around the outer circumference of the aerosol-generating article 14. In this way, no matter whether the aerosol-generating article 14 is rotated around the longitudinal axis of the aerosol-generating article 14, detection of the position of the aerosol-generating article 14 and activation of the heating element 16, as will be described in the following, is possible.

Figure 3:
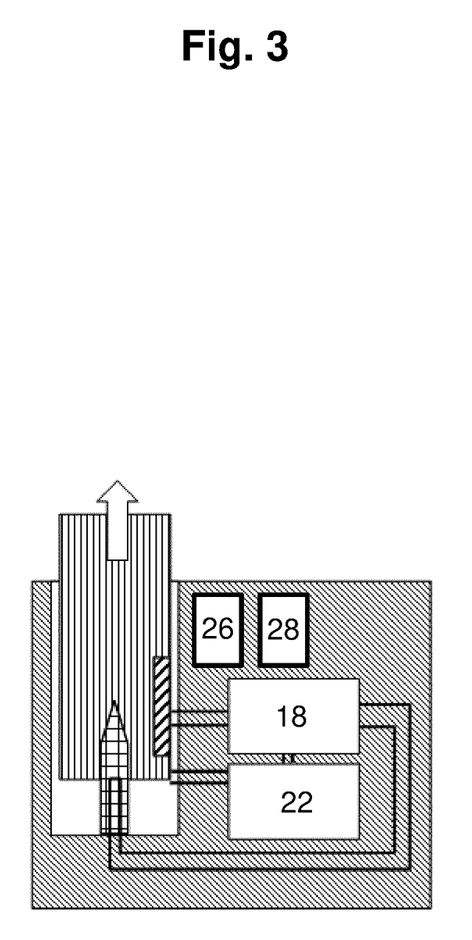
FIG. 3 shows the aerosol-generating device with an aerosol-generating article in an improper position.

In this regard, the conductive region 30 of the aerosol-generating article 14 is configured to contact the contacts of the power supply 18 as well as the contacts of the position detector 22, when the aerosol-generating article 14 is inserted into the receiving region 12. In more detail, the conductive region 30, arranged at the outer circumference of the aerosol-generating article 14, slides along the inner wall of the receiving region 12 during insertion of the aerosol-generating article 14 into the receiving region 12. As can be seen in FIGS. 1 to 3, the contacts of the power supply 18 as well as the contacts of the position detector 22 are also arranged at the inner side wall of the receiving region 12. Hence, when the aerosol-generating article 14 slides into the receiving region 12, the conductive region 30 of the aerosol-generating article 14 may contact the contact of the power supply 18 and subsequently the contacts of the position detector 22. In this regard, the contacts of the power supply 18 are arranged nearer to the proximal end of the aerosol-generating device 10 than the contacts of the position detector 22. In other words, the contacts of the power supply 18 are arranged in a downstream direction in comparison to the upstream arrangement of the contacts of the position detector 22.

For the operation of the aerosol-generating device 10, the conductive region 30 of the aerosol-generating article 14 is essential. During insertion of the aerosol-generating article 14 into the receiving region 12, at first the electrical contacts of the power supply 20 are closed by the conductive region 30 of the aerosol-generating article 14. In this regard, the conductive region 30 at first contacted both contacts of the power supply 18. After that, the power supply 18 may be configured to supply electrical energy from the power supply 18 to the heating element 16. The supply of electrical energy from the power supply 18 to the heating element 16 may be controlled by the controller 26. However, at this stage, the controller 26 may be configured to prevent supply of electrical energy from the power supply 18 to the heating element 16, since the aerosol-generating article 14 has not yet been fully inserted into the receiving region 12. If the aerosol-generating article 14 is further inserted into the receiving region 12, as depicted in FIG. 2, the aerosol-generating article 14 may be positioned in a desired optimal operation position. In this position, not only are the electrical contacts of the power supply 20 closed by the conductive region 30 of the aerosol-generating article 14, but also the electrical contacts of the position detector 24 are closed by the receiving region 12. In this regard, the receiving region 12 has an extension to close multiple contacts such as to contact the power supply 18 and the contacts of the position detector 22. Alternatively, multiple conductive regions 30 may be provided for contacting respective contacts of the power supply 18 and contacts of the position detector 22. After full insertion of the aerosol-generating article 14 into the receiving region 12, the controller 26 may be configured to enable initial activation of the heating element 16 by allowing supply of electrical energy from the power supply 18 to the heating element 16. The user may then normally operate the aerosol-generating device 10 for generating an inhalable aerosol. For activation of the heating element 16, the aerosol-generating device 10 may comprise a button (not shown) or an airflow sensor (not shown) for detecting a draw of a user.

Next, FIG. 3 will be described in more detail. In this regard, FIG. 3 shows a partial removal of the aerosol-generating article 14 from the receiving region 12. The partial removal shown in FIG. 3 is an example of an unwanted repositioning of the aerosol-generating article 14 during use or during transport of the aerosol-generating device 10. For example, if a user shakes the device during use or lets the hand holding the aerosol-generating device 10 drop between draws, the aerosol-generating article 14 received in the receiving region 12 may, at least partly, loosen. In such a case, heating of the aerosol-generating substrate contained in the aerosol-generating article 14 may be negatively impaired. However, since the aerosol-generating article 14 may not fully fall out of the receiving region 12, a user may not notice the repositioning of the aerosol-generating article 14. As shown in FIG. 3, if the aerosol-generating article 14 is partly removed from the receiving region 12, the contacts of the position detector 22 are opened due to the conductive region 30 of the aerosol-generating article 14 no longer contacting the contacts of the position detector 22. In this case, the position detector 22 may detect that the aerosol-generating article 14 is in an improper position. As a consequence, the controller 26 may be configured to control the warning element 28 to generate a warning signal. After perceiving the warning signal, a user may reposition the aerosol-generating article 14 into the optimal desired operation position, for example by pushing the aerosol-generating article 14 back into the receiving region 12. In other aspects, the aerosol-generating article 14 may be rotated or moved horizontally to optimally position the aerosol-generating article 14 in the receiving region 12 of the aerosol-generating device 10.

In a typical device, a certain degree of positional variance is acceptable for the positioning of the aerosol-generating article 14 in the receiving region 12. To vary the positional variance, which is acceptable, the shape and size and positioning of the conductive region 30 as well as of the contacts of the position detector 22 and the contacts of the power supply 18 may be modified as desired. Referring back to FIG. 2, a first positional variance 32 is depicted, in which the aerosol-generating article 14 can be moved along the longitudinal axis of the receiving region 12, while the conductive region 30 of the aerosol-generating article 14 still contacts both the context of the power supply 18 as well as the context of the position detector 22. This positional variance of the aerosol-generating article 14 may be considered as the desired optimal operation position of the aerosol-generating article 14. Within this positioning of the aerosol-generating article 14, the position detector 22 will detect that the aerosol-generating article 14 is in the desired optimal operation position and the controller 26 will not control the warning element 28 to generate a warning signal. However, if the aerosol-generating article 14 is moved further away from the heating element 16, meaning that the aerosol-generating article 14 is moved in the proximal direction out of the receiving region 12, the contacts of the position detector 22 will be opened. However, the contacts of the power supply 18 will still be closed so that operation of the heating element 16 is still enabled. Since the heating element 16 does in this case no longer fully penetrate into the aerosol-generating substrate of the aerosol-generating article 14, heating of the aerosol-generating substrate and therefore aerosol generation may still be possible, but no longer be optimally possible. Thus, the opening of the contacts of the position detector 22 may lead to the controller 26 controlling the warning element 28 to generate a warning signal to a user indicating the improper position of the aerosol-generating article 14. As long as the conductive region 30 of the aerosol-generating article 14 still closes the contacts of the power supply 18, the aerosol-generating article 14 would be considered to be in a second positional variance 34, in which operation of the heating element 16 is still possible, but the aerosol-generating article 14 is not in the desired optimal operation position. The second positional variance 34 is also denoted as the improper position. In this second positional variance 34 or improper position, the warning signal is generated. If the aerosol-generating article 14 is removed even further from the receiving region 12 of the aerosol-generating device 10, the warning signal may be ended due to opening of the contacts of the power supply 18. In this regard, the controller 26 may be configured to control the warning element's 28 generation of the warning signal, if both the contacts of the position detector 22 and the contacts of the power supply 18 are open. Also, a warning signal may not be generated, if the aerosol-generating article 14 has been depleted normally. For example, the aerosol-generating article 14 may comprise enough aerosol-generating substrate for approximately 6 to 10 draws. After that, the controller 26 may be configured to detect that the aerosol-generating article 14 has been fully depleted. Normally, a user will then remove the aerosol-generating article 14 from the receiving region 12 and insert a fresh aerosol-generating article 14 into the receiving region 12. In this case, generation of a warning signal is not desired and not necessary. Hence, the controller 26 may in this case be configured to prevent the warning element 28 from generating a warning signal.

In the aspect shown in FIGS. 1 to 3, the conductive region 30 is arranged at the aerosol-generating article 14 and the contacts of the power supply 18 and the contacts of the position detector 22 are arranged at the aerosol-generating device 10. The arrangement of these regions may be interchanged. Hence, if convenient, the aerosol-generating device 10 may comprise a conductive region 30 around the side wall of the receiving region 12 and the aerosol-generating article 14 may comprise respective contacts.

Figure 4:
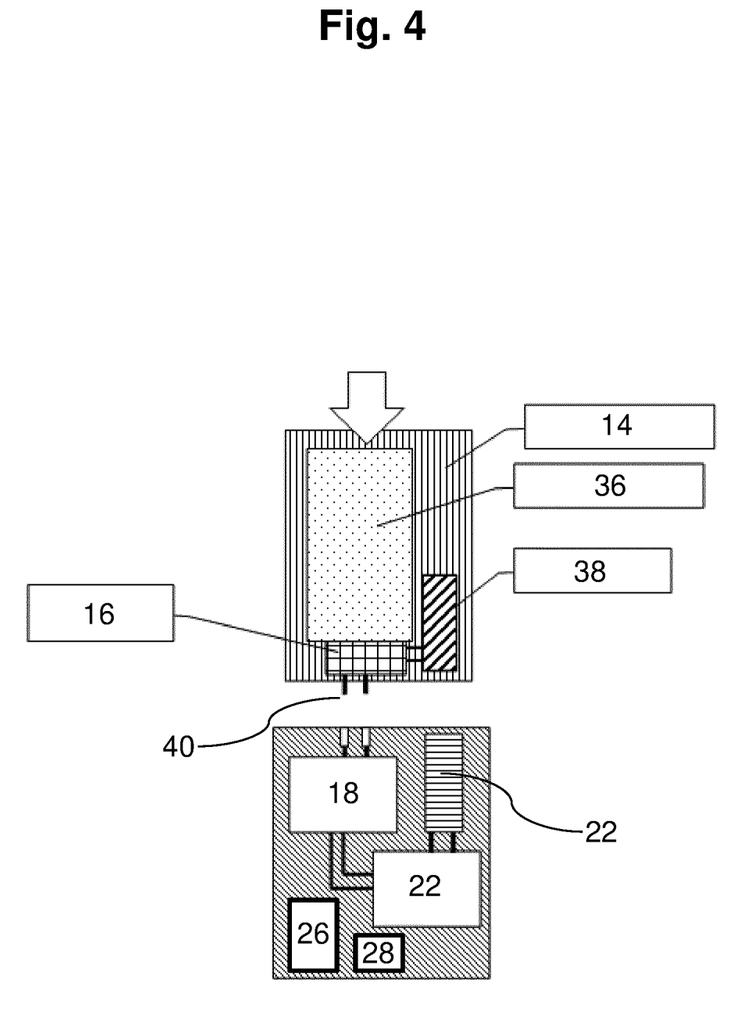
FIG. 4 shows an aerosol-generating device for usage with an aerosol-generating article in the form of a cartridge.

FIG. 4 shows a further aspect of the invention, in which the aerosol-generating article 14 is provided as a cartridge. The cartridge in this case comprises a liquid storage portion 36 containing the liquid aerosol-generating substrate. Furthermore, the heating element 16 is not arranged in the aerosol-generating device 10, but in the cartridge. In this aspect, the heating element 16 is preferably configured as electrically resistive mesh heater. The mesh heater preferably comprises interstices so that the mesh heater is fluid permeable. Liquid aerosol-generating substrate from the liquid storage portion 36 may permeate towards the mesh heater and be volatilized by the mesh heater. For the transport of the liquid aerosol-generating substrate from the liquid storage portion 36 to the heating element 16, a wicking element comprising capillary material may be employed for wicking the liquid aerosol-generating substrate.

In FIG. 4, instead of the conductive region 30 discussed above in conjunction with FIGS. 1 to 3, the position detector 22 is configured as a proximity sensor. In this regard, the position detector 22 is configured to detect the distance between a magnetic field generating element 38 provided in the cartridge and the part of the position detector 22 arranged in the aerosol-generating device 10. In other words, the proximity sensor is configured as a Hall effect sensor. If the magnetic field generating element 38 of the cartridge comes closer to the aerosol-generating device 10, particularly the part of the position detector 22 of the aerosol-generating device 10, the magnetic field generated by the magnetic field generating element 38 will be detected by the Hall sensor, which is shown in the top right part of the aerosol-generating device 10 depicted in FIG. 4. The receiving region 12 of the aerosol-generating device 10 is configured in the aspect shown in FIG. 4 as a flat surface. Any kind of known attachment means may be provided for attaching the cartridge securely to the receiving region 12.

Apart from the aerosol-generating article 14 being configured as a cartridge and the different position detector 22, the further elements of the aerosol-generating device 10 as shown in FIG. 4 is similar to the elements as discussed above with respect to FIGS. 1 to 3. In this regard, the aerosol-generating device 10 shown in FIG. 4 comprises a power supply 18, a controller 26 and a warning element 28 for generating a warning signal. The heating element 16 shown in FIG. 4 comprises contacts of the heating element 40, which are configured to contact respective contacts of the power supply 18 for enabling supply of electrical energy from the power supply 18 to the cartridge into the heating element 16 contained in the cartridge.

Figure 5:
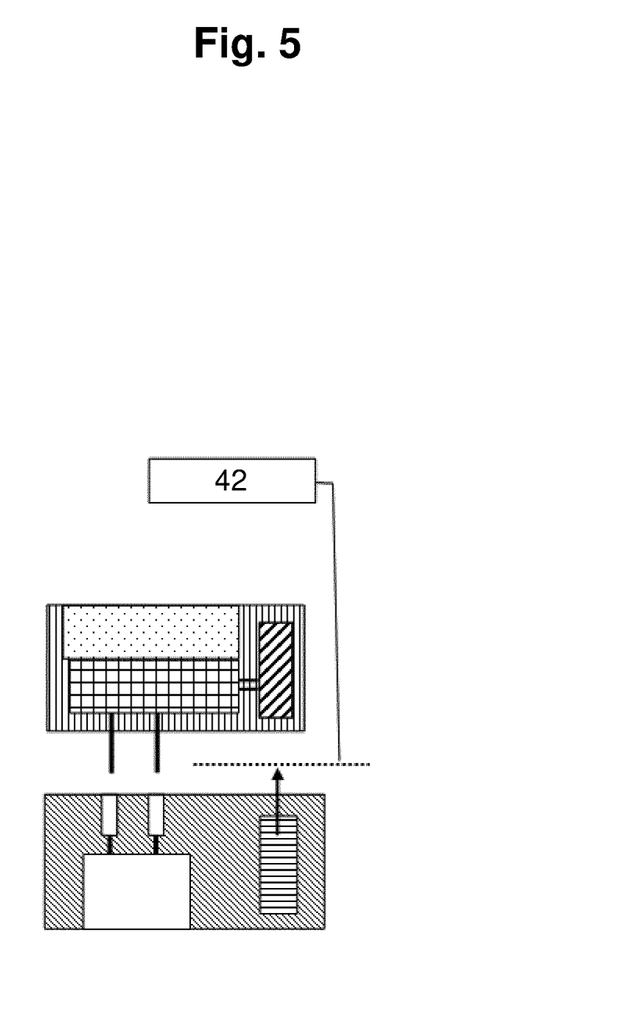
FIG. 5 shows a close-up of the connection between the aerosol-generating device and the aerosol-generating article shown in FIG. 4.

FIG. 5 shows the sensor range 42 of the position detector 22 configured as a Hall effect sensor, which is a specific kind of proximity sensor.

Figure 6:
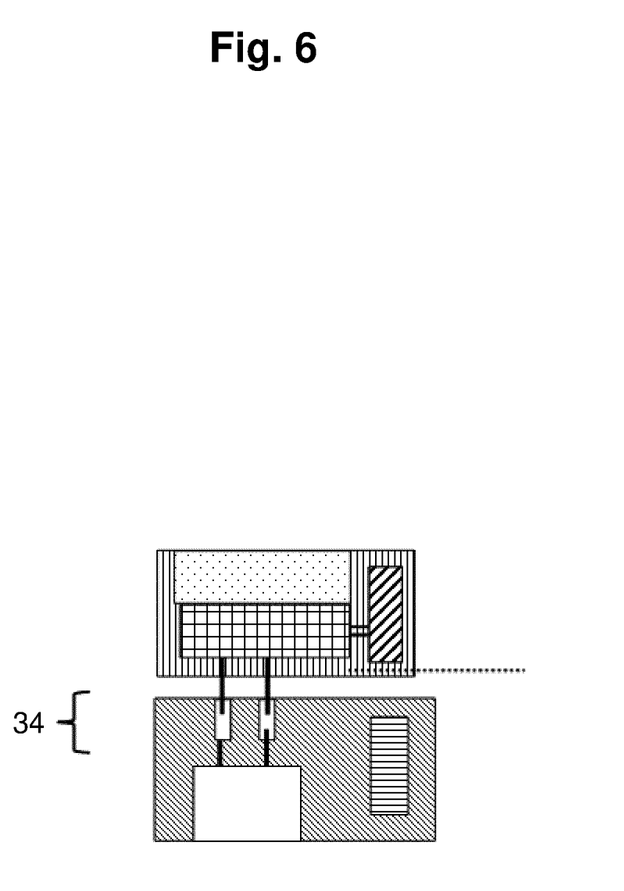
FIG. 6 shows a further close-up of the connection depicted in FIG. 5, in which the aerosol-generating article is closer to the aerosol-generating device.

FIG. 6 shows the positioning of the aerosol-generating article 14 so close to the aerosol-generating device 10 that the position detector 22 detects the position of the aerosol-generating article 14.

Figure 7:
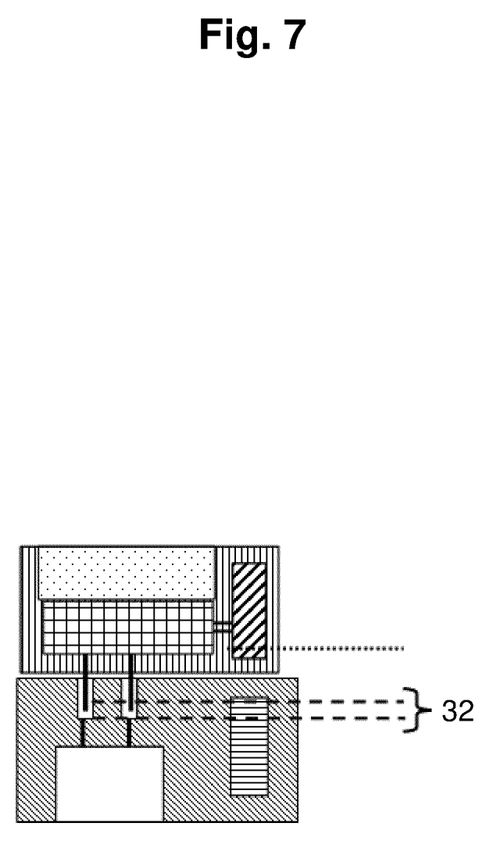
FIG. 7 shows a further close-up of the connection depicted in FIGS. 5 and 6, in which the aerosol-generating article is even closer to the aerosol-generating device.

FIG. 7 shows full attachment of the aerosol-generating article 14 for the aerosol-generating device 10. In other words, the aerosol-generating article 14 is in the desired optimal operation position in FIG. 7. Similar to the embodiment shown in FIGS. 1 to 3, a first positional variance 32 is provided, in which the aerosol-generating article 14 would be considered in the desired optimal operation position. In this position, the contacts of the heating element 40 are securely contacting the contact of the power supply 18 so that power can be supplied towards the heating element 16. If the aerosol-generating article 14 is moved apart from the aerosol-generating device 10, as shown in FIG. 6, the position detector 22 detects that the aerosol-generating article 14 is in an improper position. This position, supply of electrical energy from the power supply 18 to the heating element 16 may still be possible. However, the supply of electrical energy may potentially be negatively impaired or the aerosol-generating article 14 may undesirably detach itself from the aerosol-generating device 10. Hence, this distancing of the aerosol-generating article 14 from the aerosol-generating device 10 may be unwanted. Hence, if the aerosol-generating article 14, more particularly, the magnetic field generating element 38 comprised in the aerosol-generating article 14, is distanced from the part of the position detector 22 comprised in the aerosol-generating device 10 more than a certain distance threshold, the position detector 22 will detect that the aerosol-generating article 14 is in an improper position. As a consequence, the controller 26 will control warning element 28 to generate a warning signal. After perceiving this warning signal, a user may securely reattach the aerosol-generating article 14 with the aerosol-generating device 10.

The invention claimed is:
1. An aerosol-generating device, comprising:
a receiving region configured to removably receive an aerosol-generating article comprising an aerosol-generating substrate;
a position detector configured to detect:
an optimal operation position of the received aerosol-generating article, and
an improper position of the received aerosol-generating article different from a predetermined desired optimal operation position;

a warning element configured to generate a warning signal; and a controller configured to
- receive a signal from the position detector indicative of the position of the received aerosol-generating article,
- control the warning element to generate a warning signal when the aerosol-generating article is in the improper position different from the predetermined desired optimal operation position, and
- control the warning element to generate a further warning signal for a predetermined time, when a heating element of the aerosol-generating device is operated longer than a second predetermined time during which the aerosol-generating article is in the improper position.

2. The aerosol-generating device according to claim 1, wherein the improper position of the aerosol-generating article is a position in which vaporization and aerosol generation of the aerosol-generating substrate of the aerosol-generating article is still possible.

3. The aerosol-generating device according to claim 1,
wherein the position detector comprises electrical contacts configured to contact a conductive region of the aerosol-generating article when the aerosol-generating article is received in the receiving region, or
wherein the position detector comprises a conductive region configured to contact electrical contacts of the aerosol-generating article when the aerosol-generating article is received in the receiving region.

4. The aerosol-generating device according to claim 1, wherein the position detector comprises a proximity sensor configured to measure a distance between the position of the aerosol-generating article and an optimal operation position of the aerosol-generating article.

5. The aerosol-generating device according to claim 4, wherein the proximity sensor is configured as a Hall effect sensor.

6. The aerosol-generating device according to claim 1, wherein one or more of:
the position detector is configured to be deactivated or to prevent generation of the warning signal when the heating element of the aerosol-generating device is not operated,
the controller is configured to prevent the warning element from generating the warning signal when the heating element of the aerosol-generating device is not operated, and
the warning element is configured to be deactivated or to prevent generation of the warning signal when the heating element of the aerosol-generating device is not operated.

7. The aerosol-generating device according to claim 1, wherein the controller is further configured to prevent operation of the heating element for a duration of the further warning signal.

8. The aerosol-generating device according to claim 1, wherein the receiving region is a heating chamber.

9. The aerosol-generating device according to claim 1, wherein the controller is further configured to allow activation of the heating element only if the position detector detects that the aerosol-generating article is in an optimal operation position.

10. The aerosol-generating device according to claim 1, wherein the controller is further configured to deactivate the heating element if the position detector detects that the aerosol-generating article is in an improper position.

11. The aerosol-generating device according to claim 1,
wherein the position detector is further configured to detect a distance of the aerosol-generating article from an optimal operation position, and
wherein the warning element is configured to generate a gradual warning signal depending upon the detected distance of the aerosol-generating article from the optimal operation position.

12. The aerosol-generating device according to claim 1, wherein the heating element and the position detector utilize a common electric circuit.

13. An aerosol-generating system comprising an aerosol-generating device according to claim 1 and an aerosol-generating article comprising an aerosol-generating substrate.

14. A method for generating a warning signal for an improper position of an aerosol-generating article received in an aerosol-generating device according to claim 1, the method comprising:
detecting, by means of the position detector, a position of the received aerosol-generating article; and
controlling, by means of the controller, the warning element to generate a warning signal when the aerosol-generating article is in an improper position.

* * * * *